May 20, 1952  R. H. MURPHY ET AL  2,597,513
CONNECTION DEVICE FOR OPEN FRONT CONDUITS
Filed Sept. 28, 1946  2 SHEETS—SHEET 1
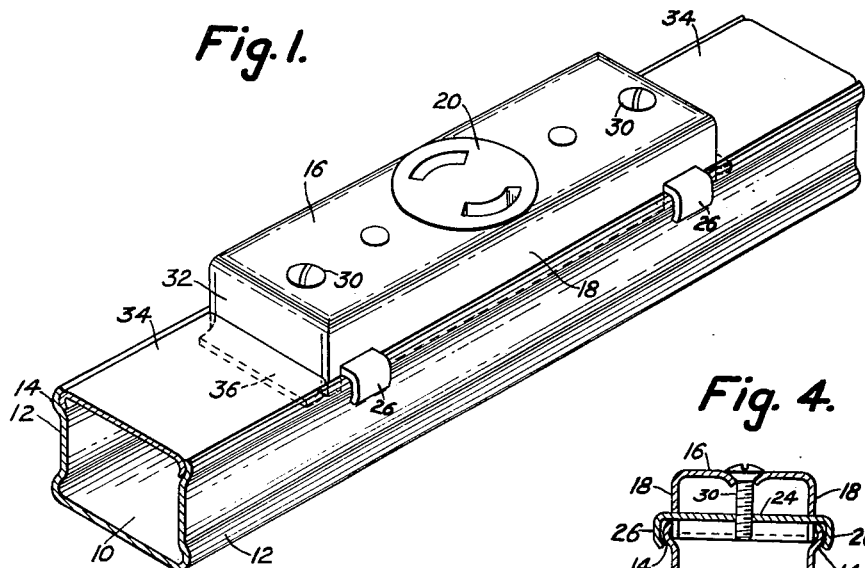
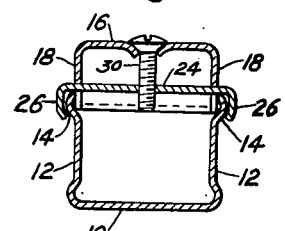
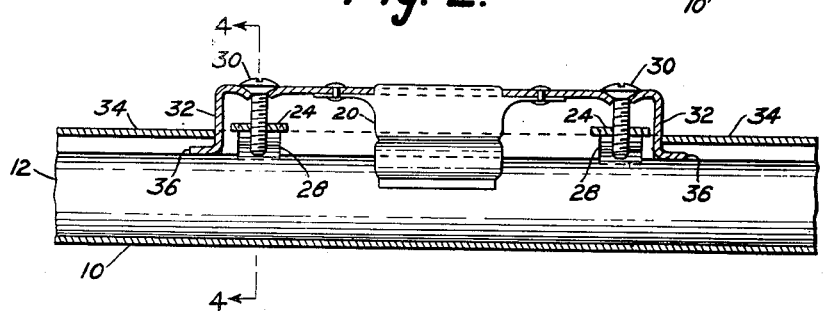
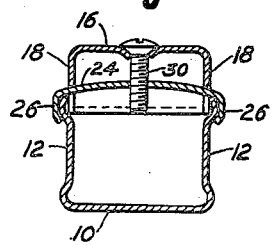
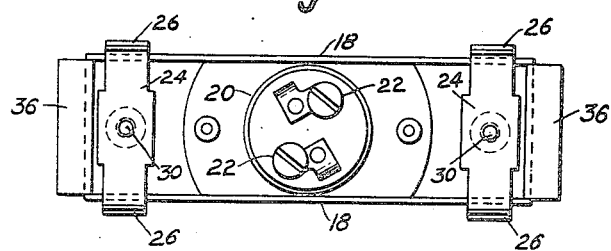
INVENTOR.
ROBERT H. MURPHY
FRANCIS P. D'ESOPO
BY S. Jay Teller
ATTORNEY

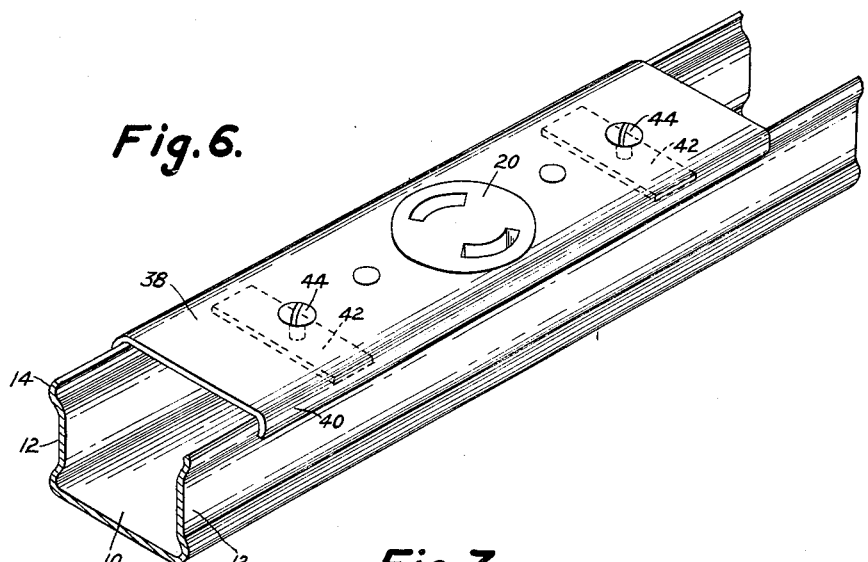
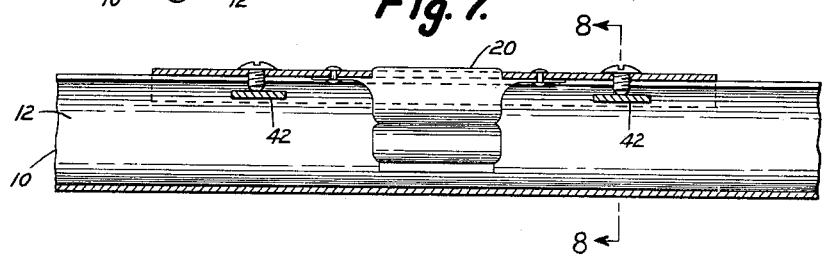
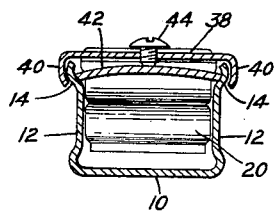 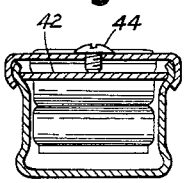 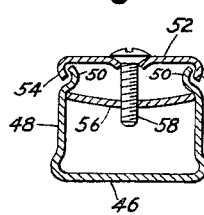 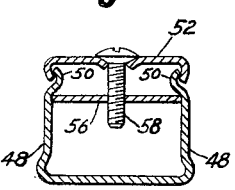
INVENTOR
ROBERT H. MURPHY
FRANCIS P. D'ESPOSO
ATTORNEY Patented May 20, 1952

2,597,513

UNITED STATES PATENT OFFICE 2,597,513

CONNECTION DEVICE FOR OPEN FRONT CONDUITS

Robert H. Murphy, West Hartford, and Francis P. D'Esopo, Hartford, Conn., assignors to The Wiremold Company, Hartford, Conn., a corporation of Connecticut Application September 28, 1946, Serial No. 700,106

12 Claims. (Cl. 138—75)

The invention relates particularly to a device, such as an electrical connection device, for use with an open front wiring conduit, particularly an open front conduit having side walls with longitudinal beads or the like near the front edges thereof.

A device embodying the invention may include an electrical socket, or a switch, or any other electrical unit which is to be connected with wires extending longitudinally through the conduit, or alternately a device embodying the invention may be merely a front cover for a portion of the conduit.

One of the objects of the invention is to provide a device for closing an open front electrical conduit which is adapted to be held in place on the conduit by a member which can be independently flexed so as to effect clamping between the side walls of the conduit and longitudinal flanges forming parts of the device.

An open front electrical conduit is commonly provided with one or more pairs of oppositely disposed longitudinal beads, and it has been the general practice to secure an electrical connection device to the conduit by means of one or more elements which internally engage some or all of the said oppositely disposed beads. This sometimes interferes with the proper positioning of the longitudinal wires within the conduit, and the means for internally engaging the beads are in many instances expensive and unreliable. Another object of the present invention is to provide an electrical connection device having a clamping means which can be independently flexed and which externally engages beads located near the front of the conduit.

A further and more specific object of the invention is to provide an electrical connection device, such as last above referred to, having clamping members which not only externally engage the beads at the front of the conduit, but which also serve to press the conduit walls inwardly against the body of the device so as to prevent spreading of the conduit walls and at the same time effect a firm and reliable connection therewith.

A still further and more specific object of the invention is to provide a device, such as above-referred to for closing an open front electrical conduit having one or more clamping members which internally engage the side walls of the conduit to force them laterally and thereby effect clamping engagement with portions of the device to hold the said device in place.

Other objects of the invention will be apparent from the drawings and from the following specification and claims.

In the drawings we have shown in detail several embodiments of the invention, but it will be understood that various changes may be made from the constructions shown, and that the drawings are not to be construed as defining or limiting the scope of the invention, the claims forming a part of this specification being relied upon for that purpose.

In the drawings:

Fig. 1 is a perspective view of an electrical connection device embodying the invention, together with a portion of a conduit with which it is engaged.

Fig. 2 is a longitudinal central sectional view through the device and the conduit shown in Fig. 1, with the clamping members unflexed.

Fig. 3 is a rear view of the electrical connection device.

Fig. 4 is a transverse sectional view taken along the line 4—4 of Fig. 2.

Fig. 5 is a view similar to Fig. 4 but showing the clamping member in clamping engagement with the conduit.

Fig. 6 is a perspective view of an alternative electrical connection device embodying the invention, together with a portion of a conduit with which it is engaged.

Fig. 7 is a longitudinal central sectional view through the device and the conduit shown in Fig. 6 with the clamping member in clamping position.

Fig. 8 is a transverse sectional view taken along the line 8—8 of Fig. 7, but showing the clamping member unflexed.

Fig. 9 is a view similar to Fig. 8 but showing the clamping member in clamping engagement with the conduit.

Fig. 10 is a transverse sectional view of another alternative embodiment of the invention with the clamping member unflexed.

Fig. 11 is a view similar to Fig. 10 but showing the clamping member in clamping engagement with the conduit.

Referring to the drawings, particularly Figs. 1 to 5 thereof, 10 is a conduit of uniform cross section having generally parallel side walls 12, 12 which are provided near the front thereof with means forming longitudinal shoulders which preferably face rearwardly. As shown, the side walls are formed with outwardly facing or outwardly convex beads 14, 14 and the rearward portions of the beads constitute the aforesaid rearwardly facing shoulders. A device, such as an electrical connection device, to which the invention more particularly relates can be mounted on the conduit 10 at the front thereof and at any desired position along its length. The electrical connection device has a body 16 adapted to closely fit the conduit side walls 12, 12, and as shown in Figs. 1 to 5 the device fits between the walls to engage the inner sides thereof. The device may carry an electrical connection unit, but the invention is not necessarily so limited. The body of the device may be in the form of a housing, having side walls 18, 18 which are adapted to closely fit within the conduit side walls 12, 12. As shown, the major portion of the housing is at the front of a plane through the front edges of the walls 12, 12, but the invention is not necessarily so limited. Any suitable electrical unit may be carried by the housing 16, and as shown, there is provided a connection socket 20 mounted in a recess in the front wall of the housing. The socket may be of any usual or preferred form and need not be described in detail, except to point out that it is provided with wire terminals 22, 22. In lieu of the socket 20 the housing may carry a switch or any other suitable electrical unit.

For holding the body or housing 16 in place one or more clamping members 24, 24 are provided, the said members being separate from and additional to the said body or housing. As shown, there are two such members, but the number may be varied. The clamping members may be widely varied within the scope of the invention, but as shown in Figs. 1 to 5, each of them has end portions 26, 26 which are positioned and shaped to lie immediately adjacent the outer faces of the beads 14, 14 on the conduit side walls. When the clamping member is in its relaxed position, as shown in Fig. 4, there are small clearances between the end portions 26, 26 thereof and the said beads 14, 14 on the conduit. Provision is made for substantially flexing each clamping member independently of the body in such a manner as to effect clamping between the body or housing and the forward portions of the side walls of the conduit. When the clamping members engage the outer faces of the beads, the flexing thereof serves to draw the end portions 26, 26 thereof into firm engagement with the beads 14, 14, as shown in Fig. 5. It will be apparent that the clamping members are independently flexed without any substantial corresponding flexing of the body or housing 16. The inner ends of the portions 26, 26 of the clamping members are curved inwardly so as to engage the rearwardly facing shoulders formed by the beads. The said inner ends of the portions 26, 26 thus constitute means adapted upon clamping to engage the rearwardly facing shoulders to prevent relative forward movement of the body or housing.

Preferably, the side walls 18, 18 of the housing are provided with oppositely disposed rearward opening notches 28, 28 through which the end portions 26, 26 of the respective clamping members project. The clamping members directly engage the front edges of the conduit walls and the notches for receiving the clamping members are of such depth that the clamping members serve to positively limit inward movement of the housing with respect to the conduit. For flexing each clamping member 24 there is preferably provided a screw 30 which has threaded engagement with the central portion of the clamping member, the head of the screw being seated in a beveled socket formed in the front wall of the housing. When the housing has been put in place, as shown in Fig. 4, the clamping members limit the inward movement thereof, as already explained, and the end portions 26, 26 of the clamping members are slightly spaced from the beads 14, 14. Then by turning the screw the clamping member can be flexed to the position shown in Fig. 5, this flexing serving to draw the end portions 26, 26 inwardly into firm engagement with the beads 14, 14. In this way the housing is firmly held in place, and the clamping members serve not only to prevent withdrawal in the forward direction, but also to prevent movement longitudinally along the conduit. Furthermore, the clamping action serves to press the side walls of the conduit inwardly against the housing and to prevent any possible spreading of the said side walls. It will be understood that the clamping members are sufficiently resilient to be restored to their original unflexed position when the screw is turned oppositely to effect release.

Preferably, the housing is provided not only with the said side walls 18, 18 but is also provided with end walls 32, 32 which extend between the side walls and serve not only to close the ends of the housing but also to prevent any relative inward movement of the side walls due to the clamping action of the members 24, 24.

In accordance with customary practice the front of the conduit is closed at both ends of the housing by cover plates 34, 34, these cover plates fitting between the beads 14, 14 and engaging the inner faces thereof. The cover plates can be snapped in from the front or can be pushed in endwise according to the circumstances of the particular installation. Preferably, in order that there may be no openings between the end walls 32, 32 and the adjacent cover plates, each end wall carries a flange 36 which projects longitudinally, being positioned to lie behind the end portion of the corresponding cover plate 34.

In use an electrical connection device, such as shown and described, can be put in place on the conduit in any desired position with respect to the length thereof, the electrical terminals 22, 22 ordinarily having been first connected with the wires within the conduit. When the connection device has been properly placed, it can be firmly held by engaging the clamping members with the conduit in the manner already described. Ordinarily the cover plates 34, 34 will be inserted after the connection device has been put in place but before the clamping members are tightened. It will be clear that the clamping members tend to prevent outward flexing of the side walls of the conduit and thus tend to hold the cover plates in place. However, it may sometimes be preferable to insert one of the cover plates before the connection device is put in place. When the device is assembled with the conduit, the interior of the latter is substantially unobstructed, this giving a maximum of space for wires.

Referring particularly to Figs. 6 to 9, 16 is a conduit which may be identical in construction with the conduit 10 shown in Figs. 1 to 5. An alternative device, such as an electrical connection device, is shown which can be mounted on the conduit 10 at the front thereof and at any desired position along its length. The electrical connection device has a body 38 adapted to closely fit the conduit side walls 12, 12. However, instead of fitting between the said side walls, the body 38 is provided with rearwardly extending flanges 40, 40 which are positioned and adapted to engage the said side walls at the outer sides thereof. The flanges 40, 40 are bent inwardly along their rearward edges so as to provide forwardly facing longitudinal shoulders which are adapted to engage the rearward portions of the beads 14, 14 which constitute rearwardly facing shoulders as already pointed out. The body 38 may be merely a front cover for a portion of the conduit or it may carry any desired electrical unit such as a connection socket 20. Other means, not shown, may be provided for closing the other portions of the front of the conduit.

For holding the body 38 in place one or more clamping members 42, 42 are provided, the said members being separate from and additional to the said body. As shown, there are two such members but the number may be varied. Each clamping member 42 is shown as being bowed forwardly in its initial unflexed position as shown in Fig. 8, the ends of the clamping member being in contact with or at least immediately adjacent the inner sides of the conduit walls 12, 12. The clamping members 42, 42 are adapted to engage the side walls at forwardly facing longitudinal shoulders formed by the beads 14, 14. Screws 44, 44 extend through threaded apertures in the front wall of the body 38 and are engageable with the clamping members 42, 42 near the centers thereof. By turning each screw 44 the corresponding clamping member 42 can be flexed from its initial bowed position as shown in Fig. 8 to a substantially straight position as shown in Fig. 9. The flexing of the clamping members serves to effect clamping between the forward portions of the side walls 12, 12 of the conduit and the flanges 40, 40 of the body. The side walls are forced outwardly to engage the flanges and when the parts are so engaged the forwardly facing shoulders on the flanges engage the rearwardly facing shoulders on the side walls to securely hold the body in place and to prevent relative forward movement thereof. It will be apparent that the clamping members are independently flexed without any substantial corresponding flexing of the body 38.

The construction shown in Figs. 10 and 11 is in many respects similar to that shown in Figs. 5 to 9 but these figures illustrate the applicability of the invention to a different form of conduit. As shown, there is a conduit 46 having side walls 48, 48 which are provided near their front edges with longitudinal beads 50, 50 which are outwardly concave instead of being outwardly convex. The upper portions of the outwardly concave beads 50, 50 constitute rearwardly facing longitudinal shoulders. A body 52 is provided having longitudinal rearwardly extending flanges 54, 54, the inner edge portions of which are bent inwardly to form forwardly facing shoulders. The body 52 may be merely a front cover for a portion of the conduit or it may carry any desired electrical unit, although no such unit is shown in the drawing.

For holding the body 52 in place one or more clamping members 56 are provided, the said members being separate from and additional to the said body. Each clamping member is shown as being bowed rearwardly in its initial unflexed position as shown in Fig. 10, the ends of the clamping member being in contact with or at least immediately adjacent the inner sides of the conduit walls 48, 48. The clamping member 56 is adapted to engage the side walls at rearwardly facing longitudinal shoulders formed by the beads 50, 50. A screw 58 extends through an aperture in the front wall of the body 52 and also extends through a threaded aperture in the clamping member 56 near the center thereof. By turning the screw 58 the clamping member can be flexed from its initial bowed position, as shown in Fig. 10, to a substantially straight position as shown in Fig. 11. The flexing of the clamping member serves to effect clamping between the forward portions of the side walls 48, 48 of the conduit and the flanges 54, 54 of the body. The side walls are forced outwardly to engage the flanges and when the parts are so engaged the forwardly facing shoulders on the flanges engage the rearwardly facing shoulders on the side walls to securely hold the body in place and prevent relative forward movement thereon. It will be apparent that the clamping members are independently flexed without any substantial corresponding flexing of the body 52.

What we claim is:

1. A device for use with an open front electrical conduit having side walls, the said device comprising in combination, a body of such size and shape as to be adapted to engage at its sides with the side walls of the conduit and to close the open front thereof, a transverse clamping member associated with the body and positioned with its ends adjacent the conduit side walls when the body is in position to close the open front of the conduit which clamping member is separate from and additional to the body and is constructed and arranged to be substantially flexed independently of the said body, and means engaging the body and the clamping member and operable when the body is in its said conduit closing position for substantially flexing the clamping member independently of the body and in a direction to cause the said end portions of the said member to apply lateral pressure to effect a clamping action between the forward portions of the conduit side walls and the sides of the body.

2. A device for use with an electrical conduit having side walls with longitudinal beads near the front edges thereof, the said device comprising in combination, a body of such size and shape as to be adapted to fit within the conduit side walls, a transverse clamping member carried by the body and having end portions which project beyond the sides of the body and are positioned and shaped to lie adjacent the outer faces of the beads on the conduit side walls when the body is in position to fit within the conduit side walls, and means engaging the body for flexing the clamping member to draw the said end portions thereof inwardly into clamping engagement with the beads.

3. A device for use with an electrical conduit having side walls with longitudinal beads near the front edges thereof, the said device comprising in combination, a housing having side walls so spaced as to be adapted to fit within the conduit side walls, a transverse clamping member carried by the housing and having end portions which project beyond the housing side walls and are positioned and shaped to lie adjacent the outer faces of the beads on the conduit side walls when the body is in position to fit within the conduit side walls, and a screw engaging the front wall of the housing and the clamping member for flexing the latter in the forward direction to draw the said end portions thereof inwardly into clamping engagement with the beads.

4. An electrical connection device for use with a conduit having side walls with outwardly convex beads near the front edges thereof, the said device comprising in combination, a housing having side walls so spaced as to be adapted to fit within the conduit side walls, the said side walls having therein two oppositely disposed notches, a transverse clamping member carried by the housing and having end portions which project through the notches in the housing side walls and are positioned and shaped to lie adjacent the outer faces of the beads on the conduit side walls when the body is in position to fit within the conduit side walls, and means on the housing for flexing the clamping member in the forward direction to draw the said end portions thereof inwardly into clamping engagement with the beads.

5. An electrical connection device for use with a conduit having side walls with outwardly convex beads near the front edges thereof, the said device comprising in combination, a housing having side walls so spaced as to be adapted to fit within the conduit side walls, the said side walls having therein two longitudinally spaced pairs of oppositely disposed notches, two transverse clamping members extending through the side wall notches of the respective pairs and positioned to engage the front edges of the conduit walls to limit rearward movement of the housing, the said members having end portions which project beyond the housing side walls and are positioned and shaped to lie adjacent the outer faces of the beads on the conduit side walls when the body is in position to fit within the conduit side walls, and screws engaging the front wall of the housing and the respective clamping members for flexing the latter in the forward direction to draw the said end portions thereof inwardly into clamping engagement with the beads.

6. An electrical connection device for use with a conduit having side walls with longitudinal beads at the front thereof, the said device comprising in combination, a housing having side walls so spaced as to be adapted to fit within the conduit side walls and having end walls which extend transversely between the side walls thereof to prevent relative inward movement thereof, a transverse clamping member carried by the housing and having end portions which project beyond the housing side walls and are positioned and shaped to lie adjacent the outer faces of the beads on the conduit side walls when the body is in position to fit within the conduit side walls, and means engaging the housing for flexing the clamping member in the forward direction to draw the said end portions thereof inwardly into clamping engagement with the beads.

7. An electrical connection device assembly comprising in combination, a conduit having side walls with outwardly convex beads near the front edges thereof, a housing having side walls closely fitting within the conduit side walls, two longitudinally spaced transverse clamping members carried by the housing and positioned to engage the front edges of the conduit walls to limit rearward movement of the housing, the said members having end portions which project beyond the housing side walls and are positioned and shaped to lie adjacent the outer faces of the beads on the conduit side walls, and means engaging the housing for flexing the clamping members to draw the said end portions thereof inwardly into clamping engagement with the beads.

8. An electrical connection device assembly comprising in combination, a conduit having side walls with outwardly convex beads near the front edges thereof, longitudinally spaced cover plates fitting between the inner faces of the beads of the conduit, a housing between the cover plates having side walls closely fitting within the conduit side walls and having therein two longitudinally spaced pairs of oppositely disposed notches, the said housing also having end walls which extend transversely between the side walls to prevent relative inward movement thereof and having flanges carried by the end walls and projecting longitudinally behind the cover plates, two transverse clamping members extending through the side wall notches of the respective pairs and engaging the front edges of the conduit walls to limit rearward movement of the housing, the said members having end portions which project beyond the housing side walls and are positioned and shaped to lie adjacent the outer faces of the beads on the conduit side walls, and means engaging the housing for flexing the clamping members to draw the said end portions thereof inwardly into clamping engagement with the beads.

9. A device for use with an open front electrical conduit having side walls formed with rearwardly facing longitudinal shoulders, the said device comprising in combination, a body of such size and shape as to be adapted to engage the conduit to close the open front thereof which body is provided with rearwardly extending flanges having forwardly facing longitudinal shoulders located and shaped to engage the rearwardly facing shoulders on the respective side walls of the conduit, a transverse clamping member constructed and shaped to be positioned between the conduit side walls with its ends closely adjacent the said side walls when the body is engaged with the conduit, and means engaging the body and the clamping member and operable when the body is engaged with the conduit for flexing the clamping member in a direction to apply lateral pressure to effect a clamping action between the forward portions of the conduit side walls and the flanges on the body.

10. A device for use with an open front electrical conduit having side walls formed at the outer sides thereof with rearwardly facing longitudinal shoulders, the said device comprising in combination, a body of such size and shape as to be adapted to engage the conduit to close the open front thereof which body is provided with rearwardly extending flanges having at the inner sides thereof forwardly facing longitudinal shoulders located and shaped to engage the rearwardly facing shoulders on the respective side walls of the conduit, a transverse clamping member constructed and shaped to be positioned between the conduit side walls and engageable at its ends with the inner sides of the said side walls when the body is engaged with the conduit, and means engaging the body and the clamping member and operable when the body is engaged with the conduit for flexing the clamping member to apply lateral outward pressure to clamp the forward portions of the conduit side walls against the flanges on the body.

11. A device for use with an open front electrical conduit having side walls formed at the outer sides thereof with rearwardly facing longitudinal shoulders, the said device comprising in combination, a body of such size and shape as to be adapted to engage the conduit to close the open front thereof which body is provided with rearwardly extending flanges having at the inner sides thereof forwardly facing longitudinal shoulders located and shaped to engage the rearwardly facing shoulders on the respective side walls of the conduit, a transverse clamping member constructed and shaped to be positioned between the conduit side walls with its ends closely adjacent the said side walls when the body is engaged with the conduit which clamping member is initially bowed in the forward direction, and means engaging the body and the clamping member and operable when the body is engaged with the conduit for flexing the clamping member in the rearward direction to cause its ends to apply lateral pressure to effect a clamping action between the forward portions of the conduit side walls and the flanges on the body.

12. A device for use with an open front electrical conduit having side walls formed at the outer sides thereof with rearwardly facing longitudinal shoulders, the said device comprising in combination, a body of such size and shape as to be adapted to engage the conduit to close the open front thereof which body is provided with rearwardly extending flanges having at the inner sides thereof forwardly facing longitudinal shoulders adapted to engage the rearwardly facing shoulders on the respective side walls of the conduit, a transverse clamping member constructed and shaped to be positioned between the conduit side walls with its ends closely adjacent the said side walls when the body is engaged with the conduit which clamping member is initially bowed in the rearward direction, and means engaging the body and the clamping member and operable when the body is engaged with the conduit for flexing the clamping member in the forward direction to cause its ends to apply lateral pressure to effect a clamping action between the forward portions of the conduit side walls and the flanges on the body.

ROBERT H. MURPHY.
FRANCIS P. D'ESOPO.

REFERENCES CITED

The following references are of record in the file of this patent:

UNITED STATES PATENTS

| Number | Name | Date |
| --- | --- | --- |
| 800,055 | Ayres | Sept. 19, 1905 |
| 821,876 | Lauth | May 29, 1906 |
| 890,285 | Krantz | June 9, 1908 |
| 2,090,239 | Strang | Aug. 17, 1937 |
| 2,455,231 | Clayton | Nov. 30, 1948 |